United States Patent [19]

Snyder

[11] Patent Number: 4,865,548

[45] Date of Patent: Sep. 12, 1989

[54] THREE-DIMENSIONAL GENEALOGICAL DISPLAY

[76] Inventor: Henry A. Snyder, 2170 Lower St. Denis Rd., St. Paul, Minn. 55116

[21] Appl. No.: 295,928

[22] Filed: Jan. 11, 1989

[51] Int. Cl.⁴ ............................................. G09B 29/00
[52] U.S. Cl. .................................................. 434/154
[58] Field of Search ............... 434/154, 107, 108, 188, 434/211; 273/241

[56] References Cited

U.S. PATENT DOCUMENTS

| | | | |
|---|---|---|---|
| 324,535 | 8/1885 | Clemens | 434/154 X |
| 329,178 | 10/1885 | Ludlow et al. | 434/154 X |
| 432,148 | 7/1890 | Rogers | 434/154 |
| 458,358 | 8/1891 | Cole | 434/154 |
| 527,261 | 10/1894 | Bailey | 434/154 X |
| 574,703 | 1/1897 | Bloch | 434/154 X |
| 627,718 | 6/1899 | Chapman | 434/154 X |
| 699,799 | 5/1902 | Guild | 283/1 A |
| 705,833 | 7/1902 | Gee | 434/154 |
| 1,058,859 | 4/1913 | Gray | 434/154 |
| 1,098,833 | 6/1914 | Olinger | 434/154 X |
| 1,148,885 | 8/1915 | Barrett | 434/154 X |
| 1,297,663 | 3/1919 | Davis | 434/154 X |
| 1,320,817 | 11/1919 | Yost | 434/154 |
| 1,447,279 | 3/1923 | Carson | 434/154 X |
| 3,339,297 | 9/1967 | Stinn et al. | 434/190 |
| 3,399,895 | 9/1968 | Beach | 273/411 |
| 3,970,313 | 7/1976 | Montemayor | 273/243 |
| 4,201,386 | 5/1980 | Seale et al. | 273/236 |
| 4,230,321 | 10/1980 | Smith | 273/308 |
| 4,332,565 | 6/1982 | Mialet | 434/118 |
| 4,375,288 | 3/1983 | Guertin | 273/273 |
| 4,483,680 | 11/1984 | Daly | 434/154 |
| 4,501,559 | 2/1985 | Griswold et al. | 434/154 |
| 4,650,422 | 3/1987 | Gorczynski | 434/154 |

FOREIGN PATENT DOCUMENTS

1283840 8/1972 United Kingdom ............... 273/241

Primary Examiner—William H. Grieb

[57] ABSTRACT

A three-dimensional family tree system displaying family relationships, including lateral lines such as aunts, uncles and cousins, comprises a number of transparent planes in a vertical assembly, one plane for each generation, each plane vertically separated from the planes above and below it by sufficient distance to allow the placement, on each plane, of a number of individual markers. To each marker is affixed the name of a family member of that generation, and each of said markers is connected by a line to the marker or markers for the said family member's parents on the plane above, and, as appropriate, by lines to one or more markers for the said family member's child or children on the plane below.

10 Claims, 2 Drawing Sheets

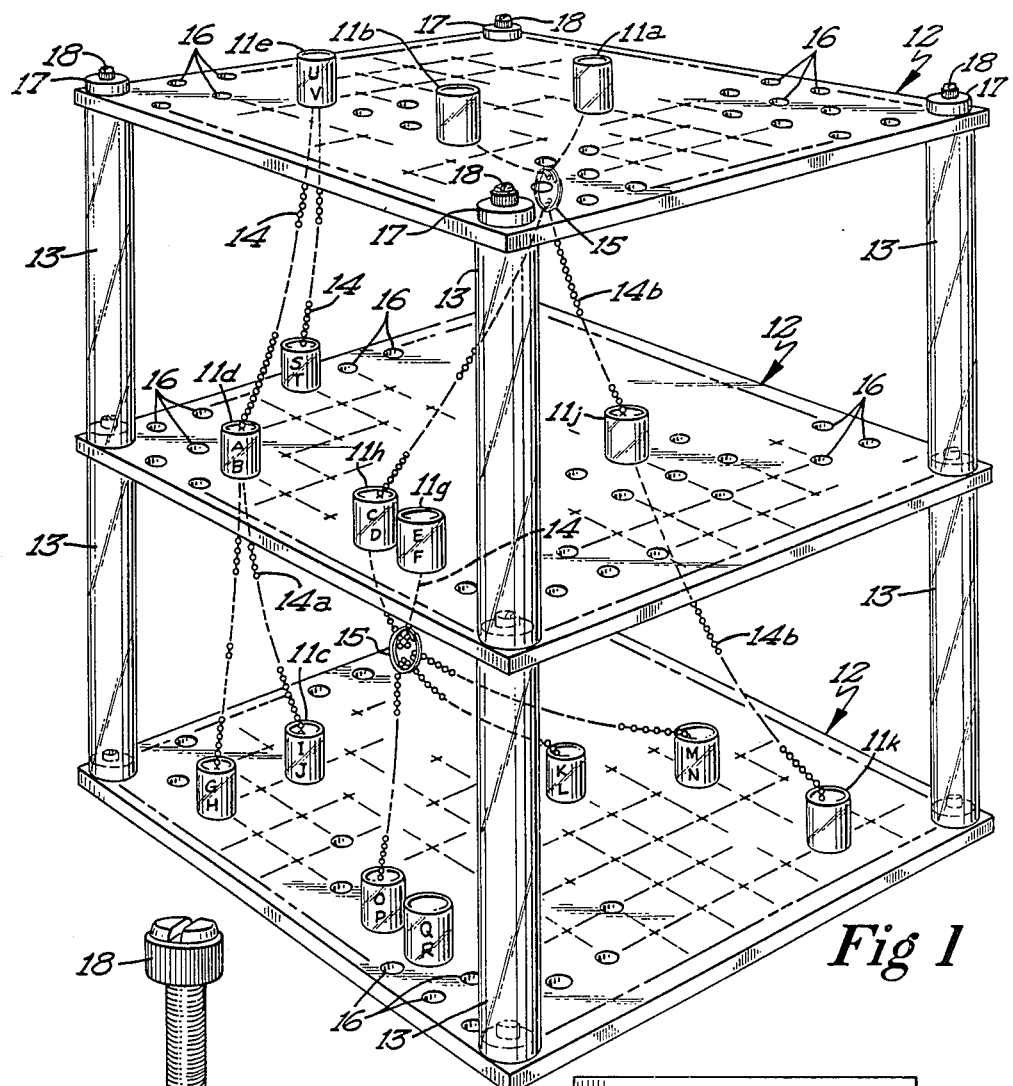
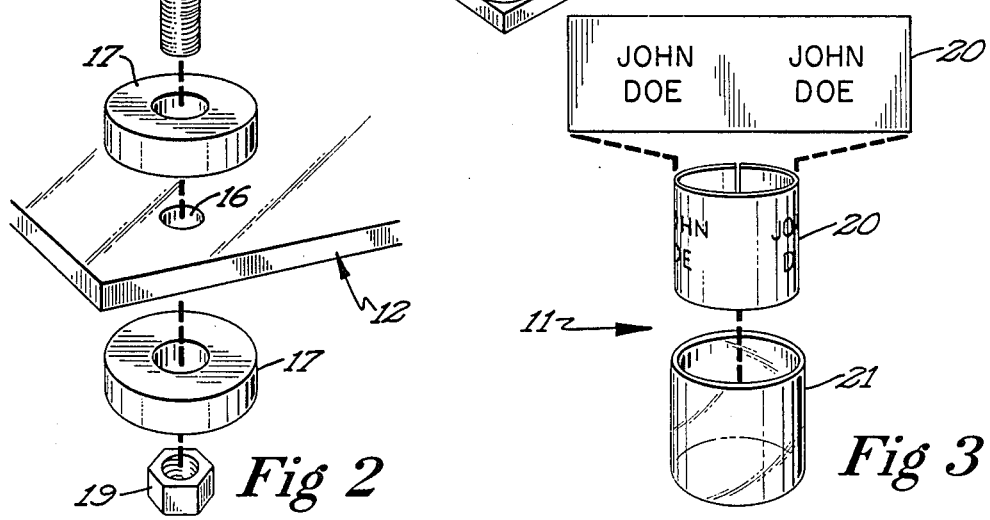
Fig 1
Fig 2
Fig 3

THREE-DIMENSIONAL GENEALOGICAL DISPLAY

FIELD OF INVENTION

This invention is directed to the construction, from modular elements, of a durable family tree. The elements comprising the invention may be assembled by any person with ordinary manual skills, and without the use of tools or adhesive substances. In particular, the invention allows the viewer to see and identify, in a compact space, a very large number of family relationships, irrespective of how distant or complex such relationships may be.

DISCUSSION OF PRIOR ART

Prior art has been almost exclusively directed at the development of numerous styles of charts. U.S. Pat. No. 329,178 discloses a concentric folded chart. U.S. Pat. No. 527,261 discloses an ancestral record book. U.S. Pat. No. 574,703, U.S. Pat. No. 627,718 and U.S. Pat. No. 1,058,859 disclose circular charts. U.S. Pat. No. 1,098,833 discloses another ancestral record book with leaves of varying lengths. Other charts are disclosed in U.S. Pat. No. 432,148, U.S. Pat. No. 458,358, U.S. Pat. No. 699,799, U.S. Pat. No. 1,297,663, U.S. Pat. No. 1,447,279, U.S. Pat. No. 4,483,680, and U.S. Pat. No. 4,501,559.

These charts and record books are adequate means of recording, in a variety of orderly ways, the names and various other vital statistics of one's relatives. In addition, the charts can generally permit the viewer to visualize, by means of lines or arrows drawn between relatives of successive generations, the relationships of those relatives in the direct line of descent, namely, one's children, grandchildren, etc., and one's parents, grandparents, great-grandparents, etc.

Such two-dimensional representations are impractical, however, for visualizing one's relationships to, e.g., great-uncles, great-great aunts, and their various descendents who are one's second cousins, third cousins and the like. To go back six generations and record only those in the direct line of descent requires identification and display of only 63 persons in total, a task that can be performed on a single chart with relative ease, and with lines drawn or other simple graphic devices used to show the relationship of each person to the other, and to identify each such person by generation.

However, it can be shown that, to include all aunts, uncles, cousins, etc., of a person and his or her spouse for the same six generations, would require a representation with some 37,000 names, based on an average of only three children from each descendent of the great-great-greatgrandparents of both spouses. A two-dimensional representation that included all such names, in the form of a linear chart with all members of each generation on the same line, would be over a quarter of a mile long. In a more usual situation, a family tree with a typical 500-800 names in six generations requires a chart about one foot high and 25 feet in length.

The prior art also discloses various games. U.S. Pat. No. 324,535 is played by sticking pins in a hole in a chart. U.S. Pat. No. 705,833 teaches a loose chain connected to a small number of hexagonally-shaped tags, each tag bearing the name of an ancestor. U.S. Pat. No. 1,148,885 is a puzzle. U.S. Pat. No. 1,320,817 is a game board with cards. U.S. Pat. No. 3,970,313 is a game board with squares around the periphery and player figures utilizing a limited non-novel chart. U.S. Pat. No. 4,230,321 is a card game. U.S. Pat. No. 4,375,288 is a board game utilizing a very limited number of relatives. The object of all these games is to teach the player the name and relationship of various direct ancestors. None of these games provide for the structured display contemplated by the present invention.

U.S. Pat. No. 4,332,565 is a digital chart, used in mapping a binary number sequence and theoretically adaptable as yet another two-dimensional format which quickly either runs out of room or expands to prodigious dimensions when attempting to display one's full family tree, and not just those few in the direct line of descent.

In U.S. Pat. No. 4,201,386, Seale and Frame describe a board with 63 prisms, each prism in the shape of a place-card and each containing the name of one of the 63 persons in a direct line of descent going back six generations. The prisms are arranged on the board more or less as the players in an elimination tournament are conventionally represented, that is, 32 in the first column, 16 in the second column, and so on. The prisms are described in the patent as on "a substantially flat playing board". The device thus uses only two dimensions to handle the expanding family structure, using the third dimension merely to accommodate a marker identifying the ancestor rather than placing said ancestor's name flat on the plane of the board.

Similarly, in U.S. Pat. No. 4,650,422, Gorczynski teaches another two-dimensional structure, applicable only, and in a very limited fashion, to direct descendents, with the plane in this invention being vertical rather than horizontal as in Seale and Frame supra. Gorczynski uses dolls rather than prisms as markers. Again the Gorczynski device expands in only two dimensions and suffers the common defect of being unable to show more than the direct ancestors. It also has no means of showing relationships, since, e.g., all great-greatgrandparents are represented by dolls sitting on the same branch, and no means are available to indicate which great-greatgrandparent is the parent of which specific greatgrandparent on the branch below.

OBJECTS AND ADVANTAGES OF THE PRESENT INVENTION

It is an object of the present invention to provide, in a compact space, a sturdy, permanent and attractive display of one's genealogical history, and if desired, of one's spouse, including descendents and ancestors, and including all lateral lines, or branches, of the family. It is a further object to present the relationships in such a way that all members of a single generation may be quickly and easily identified visually as members of a common generation. It is a still further object to visually identify and display the relationship of every individual in the family to every other individual using connecting means that link, in a visible fashion, a representation of each such individual with the like representations of his or her forebears and descendents. It is a still further object to provide for such a display in a modular format so that the resultant three-dimensional display may be expanded at any time without having to alter or dissemble the existing display. It is a still further object, in the preferred embodiment hereof, to permit the initial assembly and any subsequent additions thereto by any person of normal manual skill and without the need for any tools or for any chemicals such as adhesives and solvents.

My invention overcomes the limitations of prior two-dimensional charts and devices. For example, in prior art charts or record books, each branch or lateral line is shown on a separate page or element, and no practical means exists to display relationships between the various branches. When such branch charts are combined in scroll form into one chart or record, it becomes so long as to be impractical as a visual display. By contrast, my invention can display 500-800 family members, by generation, and with visual links connecting each person so identified to his or her own ancestors and descendents, in a space approximately one foot square and two feet in heighth.

Further objects and advantages of my invention will become apparent from a consideration of the drawings and ensuing description of it.

DESCRIPTION OF DRAWINGS

All figures show aspects of a preferred embodiment of my invention.

FIG. 1 is a perspective view of my invention, as assembled.

FIG. 2 is an exploded view of the protrusions used to stabilize the support posts that separate the generation planes.

FIG. 3 is an exploded view of my representational marker used to identify each family member represented.

LIST OF REFERENCE NUMERALS

Figure 4:
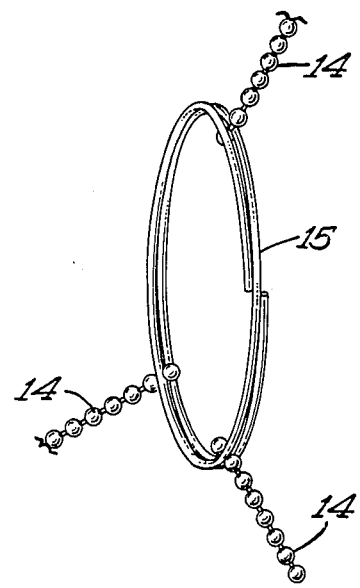
FIG. 4 is an expanded perspective view of the ring means used to terminate the one or more bead chain lengths used as generation lines emanating from each of said markers.

11—marker
12—generation plane
13—support post/spacer to separate generation planes
14—generation line
15—generation line terminator ring
16—holes in generation plane
17—washer
18—threaded screw
19—threaded nut
20—label component of marker 11
21—rigid label support component of marker 11

DESCRIPTION OF INVENTION

A transparent material, sufficiently rigid to maintain an essentially planar shape, is used to construct a number of generation planes. Each generation plane serves as a platform on which are placed markers, each of which is identified with the name of one family member belonging to that generation. All persons who are members of a single generation are represented by markers disposed on a single plane. Such planes may be of any convenient size, shape and thickness. They may be formed from glass or from any suitable transparent plastic. In a preferred embodiment, as illustrated in FIG. 1, the plane 12 is formed by cutting a sheet of acrylic, polycarbonate or polyethylene terephthalate into pieces of suitable size and shape. I have found that sheets of such plastics from ⅛" to ¼" thick are adequately stiff to maintain an essentially planar surface, although sheet stock of lesser or greater thickness may be used within the scope of my invention as long as the thickness is at least sufficient to maintain an essentially planar surface. It will be recognized that any planar surface may be expanded as necessary to dispose all the markers for the generation such plane represents, by installing additional abutting sheets at the same level.

The planes are stacked vertically and separated from each other by any convenient type of separator or spacer of sufficient strength and rigidity to hold each plane in a fixed position parallel to the ground. In a preferred embodiment, and referring again to FIG. 1, I use a clear plastic tubing segment 13, formed from a plastic sufficiently rigid for said segment to act as a structural pillar or column. I have found cellulose acetate butyrate and acrylic tubing to be satisfactory for this purpose. The tubing segments are preferably long enough to separate the planes sufficiently to permit one's hands to be comfortably inserted between any two adjacent planes to connect the generation lines and install the name markers, all as described in further detail below.

Three or more tubing segments are used to support each plane in excess of one. They may be free-standing or attached by any convenient means to the planes they separate. I prefer, for added stability, to have protrusions above and below the planes at the points where the spacer segments will be located, such protrusions having an outside diameter or configuration the same as the inside diameter or configuration of the spacer segments. In my preferred embodiment, and referring to FIG. 2 which illustrates the details of such protrusion, a hole 16 in a generation plane 12 is fitted with washers 17 of similar inside, or hole, diameter above and below the hole, said washers affixed thereto with a plastic bolt 18 and nut 19. If additional planar surfaces are required for one or more generations other than the most recent generation represented, such additional planar extensions may be supported at the required height either by assembling additional stacks abutting the first such stack, or by using support posts of sufficiently greater length to elevate the lowest additional planar extension to the required height.

The markers identifying each relative may be of any size, shape or material. In a preferred embodiment, my marker is comprised of two parts. Referring to FIG. 3, a label 20 inscribed with the name of a family member is inserted inside a rigid member 21 made of clear plastic tubing, which may be acrylic, butyrate or any other clear plastic sufficiently rigid to maintain its shape. The label conforms to the inside diameter of the rigid member without glue or adhesive, and further conceals the terminator ring used to connect the ends of the generation lines as described more fully below. I prefer this to a label affixed to the outside surface of a rigid member, since in that latter case, the label will require an adhesive, and tends to peel off over time. In FIG. 1, the completed marker unit 11 comprises the label 20 and the rigid member 21.

If the spouse of any family member is not also born into lineage which is being displayed, then typically that spouse's name would be entered on the marker of said family member to whom he or she was married. However, my invention will permit any such non-family members to be assigned their own markers, if desired.

The relationship of each person to his or her parents in the preceding generation, and to his or her children in the succeeding generation, is shown by the use of lines connecting the markers. These lines may be of string, elastic, thread, plastic or metal chain, or other suitable materials. They may be connected to each plane, at the location of the appropriate marker, by adhesive, hooks, ties or a variety of other fastener means. In a preferred embodiment, and referring to FIG. 1, I cause a multiplicity of holes 16 to be drilled, cut or otherwise fashioned in each generation plane. Such holes should be as close together as is practical to provide for as many holes as possible, since each hole will be the location for one marker. However, they must be far enough apart so that the markers may be adequately spaced to allow the names contained thereon to be read, and so that the structural integrity of the plane is not compromised. It will be apparent that three or more of such holes can also serve as locations for the protrusions, discussed above, which stabilize the support posts.

Continuing with the preferred embodiment above, and again referring to FIG. 1, plastic bead chain 14, which may be any one of a variety of colors, is passed up and down through the holes to connect the marker over each such hole with the markers for parents on the plane above and with the markers for children on the plane below. The plastic bead chain is easily cut with a scissors to the length needed, a considerable benefit since the connections to generations above and below for most lateral lines will be of varying lengths.

The various bead chain segments which link any individual to his or her parents above and children below are, in my preferred embodiment, fastened together with a circular wire ring 15, similar to a common key ring, except that said ring contains about two complete turns and is less, in outside diameter, than the inside diameter of the marker, so that, in the completed display, said ring fits inside said marker and is more or less completely hidden from view. As shown in FIG. 4, the adjacent turns of the ring are spread apart slightly, and each bead chain connecting the marker is inserted between the turns in the ring, with the bead chain effectively clamped in the string, or neck, area between two adjacent beads. Each chain so affixed merely slides further back along the concentric turns of the ring to make room for each succeeding chain.

When connecting spouses in the direct line of descent, each spouse, e.g., one's mother and one's father, will ordinarily have his or her own marker. I prefer to affix a loop of bead chain under that generation plane, connecting, in the example just given, the marker 11a of the mother to the marker 11b of the father, as illustrated in FIG. 1. The generation lines to their children on the plane below, then, are connected to this common loop. In this fashion, every marker has only one generation line up, but as many down as there are children. Since, in lateral lines, e.g., line 14a connecting marker 11c to marker 11d and line 14b connecting markers 11j and 11k, only one marker is normally used for a spousal pair, the use of a single line up to a loop representing spouses in the direct line of descent provides a more consistent representation.

While my description contains many specificities, these should not be construed as limitations on the scope of my invention, but rather as exemplification of various embodiments thereof. Many other variations are possible. Generation plane spacers, for example, may be fabricated of solid rod, and may not be transparent. Hooks may be pressed or screwed into the holes in generation planes and used to connect rubber bands or twine as generation lines. Generation planes need not have holes, in which case the generation lines may be affixed to the appropriate marker location by adhesive means or magnetic means. Markers need not be comprised of two elements, but, e.g., may be shaped like humans or tombstones, with the appropriate names etched or otherwise inscribed directly thereon.

Accordingly, the scope of my invention should be determined not by the embodiments illustrated, but by the appended claims and their legal equivalents.

I claim:

1. A three-dimensional genealogical display comprising:
   a. transparent horizontal planes, erected parallel to each other in a vertical assembly and separated from each other by a structural spacer means to provide sufficient distance between planes to permit the installation thereon and display of a multiplicity of family member representational markers and lines of descent, each of said planes providing a base for all said markers of a single generation, and with each plane, in ascending order, providing the base for markers of each preceding generation;
   b. representational markers, each containing thereon the name of a family member, all of said markers representing the members of a single generation being disposed at various points on a single plane representing such generation; and
   c. connecting means which run from each family member's marker upward to the marker or markers representing said family member's parents, and downward, as applicable, to the marker or markers representing each of said family member's children.

2. The display of claim 1 wherein the planes are transparent plastic.

3. The display of claim 2 wherein the spacer means comprises at least three transparent plastic tubular segments of sufficient and equal length to permit the assembler of the display to insert his or her hands between the planes separated by said spacer means in the disposition of the markers on the lower of said planes and in the installation of the various connector means and generation lines.

4. The display of claim 2 wherein the plastic material is acrylic, polycarbonate or polyethylene terephthalate.

5. The display of claim 2 wherein the plastic planes are provided with a multiplicity of holes to enable connecting means representing lines of descent to pass freely up and down between all planes.

6. The display of claim 5 wherein the connecting means are plastic bead chain with beads of a suitably small diameter such that one or more of such chains can pass through the holes in the planes.

7. The display of claim 6 wherein all bead chain segments emanating from a given marker are terminated by a wire ring with concentric turns through which each such bead chain segment is passed.

8. The display of claim 1 wherein the representational marker is a clear plastic cylinder, inside of which is a label containing the name of the family member to be represented, said label conforming substantially to the inner surface of said cylinder.

9. The display of claim 8 wherein the plastic is acrylic or cellulose acetate butyrate tubing.

10. A method of constructing a three-dimensional genealogical display comprising the following steps:
    a. assembling a multiplicity of transparent planes, each such plane disposed parallel to the surface of the earth and arranged one above the other, and separating each such plane from adjacent planes above and below by a spacer means;

b. disposing representational markers on said planes, each marker identifying one family member and disposing all markers representing members of a common generation on one plane, further disposing the markers representing the preceding generation on the plane next above and those representing the succeeding generation on the plane next below; and c. connecting the markers of each family member to the markers representing said family member's parents and children by means of lines that are affixed to and connect each such marker location in a line of descent.

* * * * *